Feb. 20, 1923.
F. W. MARHEINE.
BABY WAGON.
FILED APR. 10, 1922.
1,445,781.
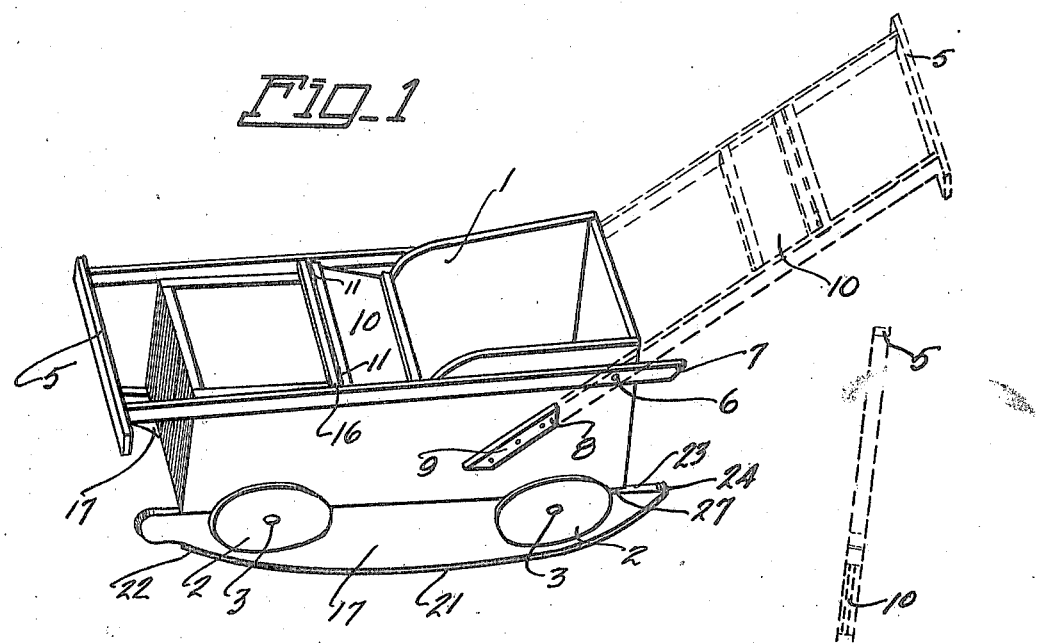
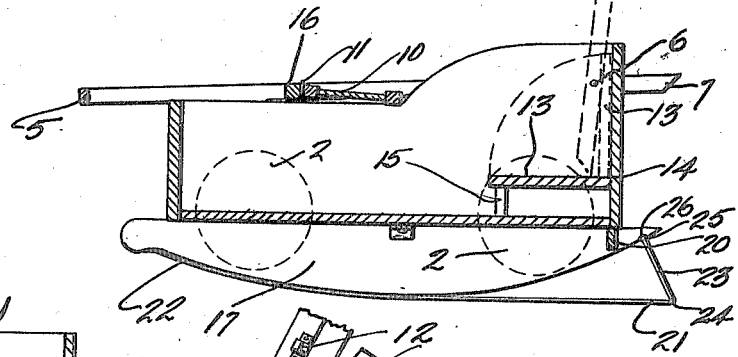
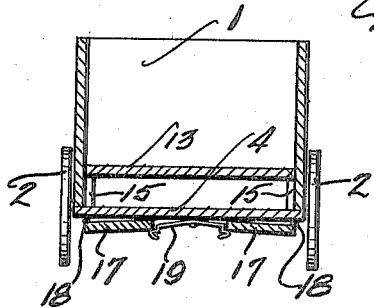
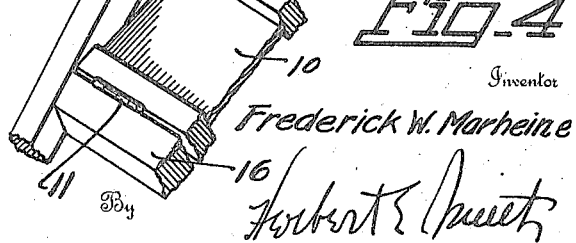
Inventor
Frederick W. Marheine
By
Attorney Patented Feb. 20, 1923.

1,445,781

UNITED STATES PATENT OFFICE.

FREDERICK W. MARHEINE, OF SPOKANE, WASHINGTON.

BABY WAGON.

Application filed April 10, 1922. Serial No. 551,320.

*To all whom it may concern:*

Be it known that I, FREDERICK W. MARHEINE, a citizen of the United States, residing at Spokane, in Spokane County and State of Washington, have invented certain new and useful Improvements in Baby Wagons, of which the following is a specification.

My present invention relates to improvements in baby wagons of the convertible type, whereby the device may be used as a go-cart or converted for use as a rocker or rocking horse, and also utilized as a sled. The primary object of the invention is the provision of such a wagon or vehicle that is comparatively inexpensive in cost of production, is practical and durable, and which may be converted for several uses with facility and convenience. By the utilization of the several features of my invention a compactly arranged, well braced and strong, combination vehicle is provided which in use may be substituted for and perform the functions of several different articles. To this end the invention consists in certain novel combinations and arrangements of parts as will be hereinafter more fully described and claimed.

In the accompanying drawings I have illustrated one complete example of the physical embodiment of my invention, wherein the parts are combined and arranged according to the best mode I have thus far devised for the practical application of the principles of my invention.

Figure 1 is a view in perspective of the combination wagon, utilized as a baby's rocking horse, showing the handle in dotted lines when used as a go-cart, or the handle in dotted position may be used to rock the device similar to a cradle.

Figure 2 is a longitudinal, vertical sectional view through the body of the vehicle, illustrating the runners in use when the vehicle is used as a sleigh, showing the handle in uplifted position and dotted.

Figure 3 is a transverse, vertical sectional view through the body of the wagon, resting upon its wheels, the rockers and runners being stowed away beneath the body of the wagon.

Figure 4 is a detail, fragmentary, perspective view of the hinged tray forming part of the handle.

The body 1 of the vehicle is shown of box-like or rectangular form and is provided with two pairs of wheels 2, 2, 2, 2, that are supported on fixed bearing axles 3, the latter secured in suitable manner to the bottom 4 of the wagon body. As a wagon, the vehicle may be trundled along on its wheels and pushed from the handle 5, which is fashioned as a U-shaped yoke with its arms pivoted at 6 at the sides and rear of the body. The ends of the yoke-handle are beveled as at 7 to engage with complementary beveled ends 8 of a pair of diagonally placed cleats 9, one fixed at each side of the wagon body. These cleats are nailed or screwed to the wagon body and are positioned in such manner that the pivoted yoke-handle, when turned to dotted position of Figure 1, will provide a rigid and well braced pushing and guiding means that is disposed in convenient position for the hands of the attendant.

For the convenience of the occupant of the wagon a tray 10 is hinged at 11 within the yoke-handle, and latches 12 are employed to retain the tray in proper position. For emptying or cleaning the tray, it may be unlatched and swung to convenient position for emptying the débris or washing and cleansing.

At the rear of the wagon an interior seat 13 is provided, which is hinged at 14 and rests upon side blocks 15 to elevate it from the bottom of the wagon. If desired, the seat may be turned to vertical or upright position, as indicated by dotted lines in Figure 2, thus affording the entire area of the wagon body for the convenience of the occupant.

The yoke-handle is designed to swing down to horizontal position as in Figures 1 and 2, with the cross bar 16 thereof resting upon the sides of the wagon body and the arms of the yoke positioned along the outer upper edges of the body. In this position of the handle yoke, the tray is in convenient position in front of the seated occupant for use, with its unlatched, rear edge resting upon the longitudinal upper edges of the wagon body.

Beneath the body of the wagon body are disposed a pair of spaced, foldable rockers 17, 17, which are hinged at 18 along the longitudinal corners or edges of the wagon body. The rockers may be swung up beneath the wagon, as in Figure 3 and stowed away by connection with the resilient clip or hook 19 fixed at the longitudinal center of the wagon bottom. When turned down to vertical position for use, as in Figures 1 and 2, these rockers are held in correct position by a pivoted turn button or cleat 20 which is pivoted to the bottom of the wagon to swing into position transverse thereto and engage the rockers and hold them extended. When the rockers are to be stowed away, the turn-button or cleat is turned to release the rockers and they may then be swung beneath the wagon bottom and secured by the hooked cleat or clip 19.

In Figure 1 the device is used as a rocker or rocking horse, and is supported on the rockers for that purpose.

When used as a sled, as in Figure 2, a pair of metal runners 21 are utilized. These runners are secured, as at 22 at the front of the rockers and extend along beneath the rockers toward the rear. The runners are fixed only at the front, and are of resilient metal, as steel in order that they may be made to conform to the curvature of the rockers as in Figure 1, or be extended to rest flatly upon the snow surface, as in Figure 2. At the rear end of each runner, an extension 23 is hinged, the hinge being indicated at 24, and this extension is used as a rear brace in Figure 2 to hold the flat runner in proper position. The brace is provided with a head 25 to engage in a notch 26 or seat in the rocker, and as the runner is firmly anchored to the rocker at 22, a rigid and well braced runner is thus provided for the sled. When not in the position for use, the resilient runner is bent at the rear to conform to the curvature of the rocker, as in Figure 1, and the hinged brace is folded over and inserted in a mortise 27 between the body of the wagon and the top of the rocker. The runners are of course folded beneath the wagon body with the rockers when the latter are not in use.

From the above description taken in connection with my drawings it is evident that I have provided a combination or convertible vehicle that fulfills the conditions set forth as the purpose of my invention.

Having thus fully described my invention, what I claim as new and desire to secure by Letters Patent is

1. The combination with a wheeled vehicle convertible for use, of a pair of spaced longitudinally disposed, foldable rockers, a runner of resilient metal having a fixed anchorage at the front of each rocker, and a hinged brace at the rear end of each runner, whereby the vehicle may be converted for use as a rocker or sled.

2. The combination with a vehicle body of a pair of spaced, longitudinally foldable, hinged rockers and means for retaining them in folded position, means for retaining said rockers in vertical position, a resilient metal runner on each rocker each having a fixed front anchorage, and a hinged brace at the rear end of each said runner adapted to engage its rocker.

In testimony whereof I affix my signature.

FREDERICK W. MARHEINE.